(12) United States Patent
Hosseinimakarem (10) Patent No.: US 11,601,589 B2
(45) Date of Patent: Mar. 7, 2023

(54) ACTUATING AN IMAGE SENSOR

(71) Applicant: Micron Technology, Inc., Boise, ID (US)

(72) Inventor: Zahra Hosseinimakarem, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/020,981

(22) Filed: Sep. 15, 2020

(65) Prior Publication Data

US 2022/0086338 A1    Mar. 17, 2022

(51) Int. Cl.
    *H04N 5/232*    (2006.01)
    *H04N 5/76*    (2006.01)
    *G06T 7/292*    (2017.01)
    *G06V 20/00*    (2022.01)

(52) U.S. Cl.
    CPC ......... *H04N 5/23222* (2013.01); *G06T 7/292* (2017.01); *G06V 20/00* (2022.01); *H04N 5/23212* (2013.01); *H04N 5/23245* (2013.01); *H04N 5/76* (2013.01)

(58) Field of Classification Search
    CPC ........... H04N 5/23222; H04N 5/23212; H04N 5/23245; H04N 5/76; G06T 7/292; G06K 9/00624
    USPC ........................................................ 348/169
    See application file for complete search history.

(56) References Cited

U.S. PATENT DOCUMENTS

| | | |
|---|---|---|
| 7,110,643 B2 | 9/2006 | Sugiyama et al. |
| 7,340,293 B2 | 3/2008 | McQuilkin |
| 7,627,147 B2 | 12/2009 | Loiacono et al. |
| 8,194,170 B2 | 6/2012 | Golub et al. |
| 8,463,006 B2 | 6/2013 | Prokoski |
| 9,201,289 B2 | 12/2015 | Tanaka et al. |
| 9,836,648 B2 | 12/2017 | Perna et al. |
| 10,393,990 B2 | 8/2019 | Huang |
| 10,438,465 B1 | 10/2019 | Bart et al. |
| 10,628,729 B2 | 4/2020 | Sareen |

(Continued)

FOREIGN PATENT DOCUMENTS

WO    2019-118960 A1    6/2019

OTHER PUBLICATIONS

International Search Report and Written Opinion related to international application No. PCT/US2021/046249, dated Dec. 3, 2021, 9 pages.

*Primary Examiner* — Thai Q Tran
*Assistant Examiner* — Nienru Yang
(74) *Attorney, Agent, or Firm* — Brooks, Cameron & Huebsch, PLLC (57) ABSTRACT

Methods and devices related to actuating an image sensor are described. In an example, a method can include generating a first image of an area at a first time using an array of image sensors, wherein each image sensor of the array of image sensors is coupled to a respective actuator, generating a second image of the area at a second time using the array of image sensors, comparing the first image to the second image using a processing resource coupled to the array of image sensors, identifying a moving object based at least in part on comparing the first image to the second image, and activating the actuator for each image sensor of the array of image sensor used to generate the first and second images based at least in part on identifying the moving object.

20 Claims, 3 Drawing Sheets

(56) References Cited

U.S. PATENT DOCUMENTS

| | | | |
|---|---|---|---|
| 2008/0158365 A1* | 7/2008 | Reuter | H04N 5/345 |
| | | | 348/207.1 |
| 2013/0235174 A1* | 9/2013 | Namii | G03B 11/00 |
| | | | 348/65 |
| 2016/0171852 A1* | 6/2016 | Lin | G06K 9/00771 |
| | | | 382/103 |
| 2016/0353011 A1 | 12/2016 | Sambonsugi et al. | |
| 2017/0223261 A1 | 8/2017 | Shimizu et al. | |
| 2018/0278820 A1* | 9/2018 | Piekniewski | B60W 30/14 |
| 2018/0302564 A1* | 10/2018 | Liu | G06T 7/33 |
| 2019/0303708 A1 | 10/2019 | Kim et al. | |

* cited by examiner

ACTUATING AN IMAGE SENSOR

TECHNICAL FIELD

The present disclosure relates generally to actuating an image sensor.

BACKGROUND

An image sensor can convert an optical image into an electrical signal. Image sensors, also referred to as imagers, can be included in digital cameras, camera modules, camera phones, medical imaging equipment, night vision, radar, and sonar, for example. These devices can include memory.

Memory devices are typically provided as internal, semiconductor, integrated circuits in computers or other electronic devices. There are many different types of memory including volatile and non-volatile memory. Volatile memory can require power to maintain its data and includes random-access memory (RAM), static random access memory (SRAM), dynamic random access memory (DRAM), and synchronous dynamic random access memory (SDRAM), among others. Non-volatile memory can provide persistent data by retaining stored data when not powered and can include NAND flash memory, NOR flash memory, read only memory (ROM), Electrically Erasable Programmable ROM (EEPROM), Erasable Programmable ROM (EPROM), and resistance variable memory such as phase change random access memory (PCRAM), 3D XPoint™, resistive random access memory (RRAM), and magnetoresistive random access memory (MRAM), among others.

Memory is also utilized as volatile and non-volatile data storage for a wide range of electronic applications, including, but not limited to personal computers, portable memory sticks, digital cameras, cellular telephones, portable music players such as MP3 players, movie players, and other electronic devices. Memory cells can be arranged into arrays, with the arrays being used in memory devices.

Computers or other electronic devices can include a number of memory devices. In some examples, different types of memory can be included on the same electronic device for optimal performance of the electronic device. However, different types of memory devices may require separate data paths and/or controls for each type of memory device.

DETAILED DESCRIPTION

The present disclosure includes methods and apparatuses related to generating a first image of an area at a first time using an array of image sensors, wherein each image sensor of the array of image sensors is coupled to a respective actuator, generating a second image of the area at a second time using the array of image sensors, comparing the first image to the second image using a processing resource coupled to the array of image sensors, identifying a moving object based at least in part on comparing the first image to the second image, and activating the actuator for each image sensor of the array of image sensors used to generate the first and second images based at least in part on identifying the moving object.

The image sensor can be, for example, a complementary metal oxide semiconductor (CMOS) sensor cell and/or a charge-coupled device (CCD) cell. A CMOS sensor can include a number of metal-oxide-semiconductor field-effect transistor (MOSFET) amplifiers and a CCD can include a number of metal-oxide-semiconductor (MOS) capacitors. The image sensor can convert a number of photons from the light to a number of electrons to generate an image. A portion of light can be received at each image sensor of an array of image sensors and each image sensor of the array of image sensors can generate an image from the portion of light it received. Each image sensor of the array of image sensors can transmit an image to a processing resource. The processing resource can receive the one or more images and combine the one or more images received to create a picture. In some examples, the picture and/or the one or more images can be stored in a memory coupled to the processing resource.

In a number of embodiments, an image sensor can generate and transmit a first image and a second image to a processing resource. The processing resource can receive and compare the first image and the second image. A moving object can be identified by the processing resource if the first image and the second image are different. In some examples, the processing resource can generate a command to activate an actuator to move the image sensor to a particular location (e.g., the last determined location of the object, the current location of the object, a future location of the object, etc.) to follow the moving object.

An array of image sensors may be coupled to an actuator or each image sensor can be coupled to an actuator. An actuator can allow the one or more image sensors to yaw, pitch, roll, and translate to enable the one or more image sensors to follow a moving object. The actuator can be, for example, a micro actuator, a piezoelectric actuator, electric actuator, hydraulic actuator, pneumatic actuator, or a combination thereof.

As used herein, "a number of" something can refer to one or more of such things. For example, a number of image sensors can refer to one or more image sensors. A "plurality" of something intends two or more. Additionally, designators such as "X", "Y", and "Z", as used herein, particularly with respect to reference numerals in the drawings, indicates that a number of the particular feature so designated can be included with a number of embodiments of the present disclosure.

The figures herein follow a numbering convention in which the first digit or digits correspond to the drawing figure number and the remaining digits identify an element or component in the drawing. Similar elements or components between different figures may be identified by the use of similar digits. For example, reference numeral 102 may reference element "2" in FIG. 1A, and a similar element may be referenced as 202 in FIG. 2. In some instances, a plurality of similar, but functionally and/or structurally distinguishable, elements or components in the same figure or in different figures may be referenced sequentially with the same element number (e.g., 102-1, 102-2, and 102-X in FIG.

1). As will be appreciated, elements shown in the various embodiments herein can be added, exchanged, and/or eliminated so as to provide a number of additional embodiments of the present disclosure. In addition, the proportion and the relative scale of the elements provided in the figures are intended to illustrate various embodiments of the present disclosure and are not to be used in a limiting sense.

Figure 1A:
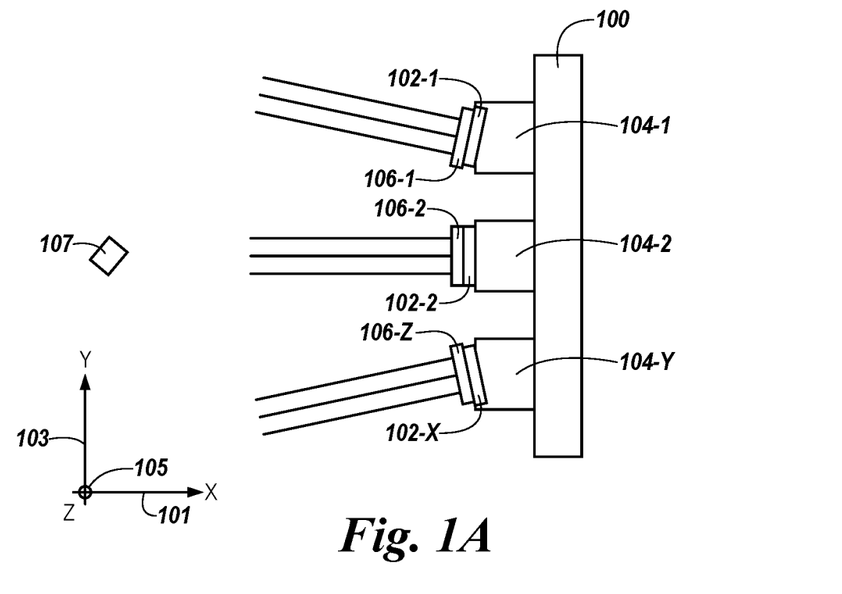
FIG. 1A illustrates an example of an apparatus for actuating an image sensor in accordance with a number of embodiments of the present disclosure.
Figure 1B:
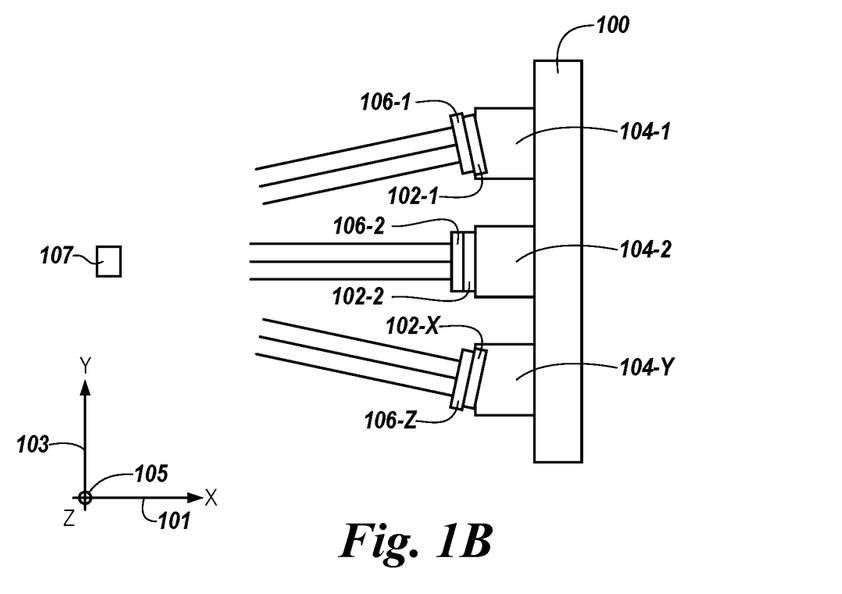
FIG. 1B illustrates an example of an apparatus for actuating an image sensor in accordance with a number of embodiments of the present disclosure.

FIGS. 1A and 1B illustrate an example of an apparatus 100 for actuating an array of image sensors 102-1, 102-2, ..., 102-X in accordance with a number of embodiments of the present disclosure. The apparatus 100 can be, but is not limited to, a baby monitor, a security camera (e.g., surveillance camera), a door camera, a trail camera, a tablet camera, a digital camera, a personal laptop camera, a desktop computer camera, a smart phone camera, a wrist worn device camera, an imaging device, a detection device, and/or redundant combinations thereof. The apparatus 100, as illustrated in FIGS. 1A and 1B, can further include a plurality of actuators 104-1, 104-2, ..., 104-Y and a plurality of micro lenses 106-1, 106-2, ..., 106-Z.

In a number of embodiments, a portion of light can be received at each image sensor of the array of image sensors 102-1, 102-2, ..., 102-X. Each image sensor of the array of image sensors 102-1, 102-2, ..., 102-X can convert a number of photons from their portion of light to a number of electrons to generate an image.

The image sensors 102-1, 102-2, ..., 102-X can be, for example, a complementary metal oxide semiconductor (CMOS) sensor cell and/or a charge-coupled device (CCD) cell. A CMOS sensor can include a number of metal-oxide-semiconductor field-effect transistor (MOSFET) amplifiers and a CCD can include a number of metal-oxide-semiconductor (MOS) capacitors.

The array of image sensors 102-1, 102-2, ..., 102-X may be coupled to an actuator 104-1, 104-2, ..., 104-Y or each image sensor 102-1, 102-2, ..., 102-X can be coupled to a respective actuator 104-1, 104-2, ..., 104-Y. For example, image sensor 102-1 can be coupled to actuator 104-1, as illustrated in FIG. 1A. An actuator 104-1, 104-2, ..., 104-Y can allow the one or more image sensors 102-1, 102-2, ..., 102-X to yaw, pitch, roll, and translate to enable the one or more image sensors 102-1, 102-2, ..., 102-X to follow a moving object in the x-axis 101, y-axis 103, and/or z-axis 105. An actuator 104-1, 104-2, ..., 104-Y can be, for example, a micro actuator, a piezoelectric actuator, electric actuator, hydraulic actuator, pneumatic actuator, or a combination thereof.

Each of the plurality of micro lenses 106-1, 106-2, ..., 106-Z can be coupled to an actuator 104-1, 104-2, ..., 104-Y. Micro lenses 106-1, 106-2, ..., 106-Z can be lenses with diameters less than, for example, a millimeter. A plurality of micro lenses 106-1, 106-2, ..., 106-Z can be formed on a substrate to create a micro lens array. Each of the plurality of micro lenses 106-1, 106-2, ..., 106-Z can be positioned such that light (e.g., a light source input) passes through the micro lenses 106-1, 106-2, ..., 106-Z prior to being received by the array of image sensors 102-1, 102-2, ..., 102-X.

In a number of embodiments, the micro lenses 106-1, 106-2, ..., 106-Z can include embedded optics to reduce and/or prevent diffraction of light prior to the light being received by the array of image sensors 102-1, 102-2, ..., 102-X. Diffraction is the spreading out of light waves. Light can diffract and lose its intensity with distance. The embedded optics can be coupled to or be a portion of micro lenses 106-1, 106-2, ..., 106-Z. The embedded optics can be shaped to prevent light received by the image sensors 102-1, 102-2, ..., 102-X from being diffracted and/or decrease the amount of diffraction of the light. Light with little or no diffraction allows the image sensors 102-1, 102-2, ..., 102-X to generate an image from the light with a greater depth of focus, which can make the objects present in the image identifiable at a larger distance. For example, the image sensors 102-1, 102-2, ..., 102-X can capture an image at a greater distance away by utilizing the micro lenses 106-1, 106-2, ..., 106-Z including embedded optics.

The embedded optics can include an axicon, a cubic phase plate, a radial polarization conversion plate, an azimuthal polarization conversion plate, and/or a linear polarization conversion plate, for example. In a number of embodiments, an axicon, a cubic phase plate, and/or a polarization conversion plate can be used in conjunction with the image sensors 102-1, 102-2, ..., 102-X. Placing an axicon, a cubic phase plate, and/or a polarization conversion plate in front of image sensors 102-1, 102-2, ..., 102-X will reduce diffraction of the light received by the image sensors 102-1, 102-2, ..., 102-X. This allows the light to maintain its intensity over a greater distance. In some examples, apparatus 100 including an axicon, a cubic phase plate, and/or a polarization conversion plate can capture an image at a greater distance away from the apparatus 100 than an apparatus 100 without the axicon, the cubic phase plate, and/or the polarization conversion plate.

As illustrated in FIG. 1A, each image sensor of the array of image sensors 102-1, 102-2, ..., 102-X can be positioned at different angles to generate different images of an area. If apparatus 100 is placed in a corner of a room, for example, image sensor 102-1 may capture a first wall and a portion of a second wall, image sensor 102-2 may capture a different portion of the second wall and a portion of a third wall, and image sensor 102-X may capture a different portion of the third wall and a fourth wall.

Each image sensor of the array of image sensors 102-1, 102-2, ..., 102-X can generate an image in response to a command and/or periodically. For example, an image can be generated every millisecond. Each image sensor of the array of image sensors 102-1, 102-2, ..., 102-X can generate an image with lower resolution to conserve energy, memory, and/or processing resources. In response to, for example, identifying a moving object 107, one or more of the image sensors of the array of image sensors 102-1, 102-2, ..., 102-X can increase the number of images generated each second and/or generate a higher resolution image. In some examples, higher resolution images and/or a greater number of images can increase the accuracy of image recognition.

As illustrated in FIG. 1B, each image sensor of the array of image sensors 102-1, 102-2, ..., 102-X can be positioned at different angles to focus on the same particular area. For example, each image sensor of the array of image sensors 102-1, 102-2, ..., 102-X can move to focus on an object 107 in response to identifying that the object 107 is moving. Each image from the array of image sensors 102-1, 102-2, ..., 102-X focused on the object 107 can be combined to create a higher resolution image. For example, image sensor 102-1 may generate a first image of a first portion of the object 107, image sensor 102-2 may generate a second image of a second portion of the object 107, and image sensor 102-X may generate a third image of a third portion of the object 107 and the first, second, and third images can be combined to create a picture of the entire object 107. In some examples, a greater number of images can be taken in response to identifying that the object 107 is moving.

Figure 2:
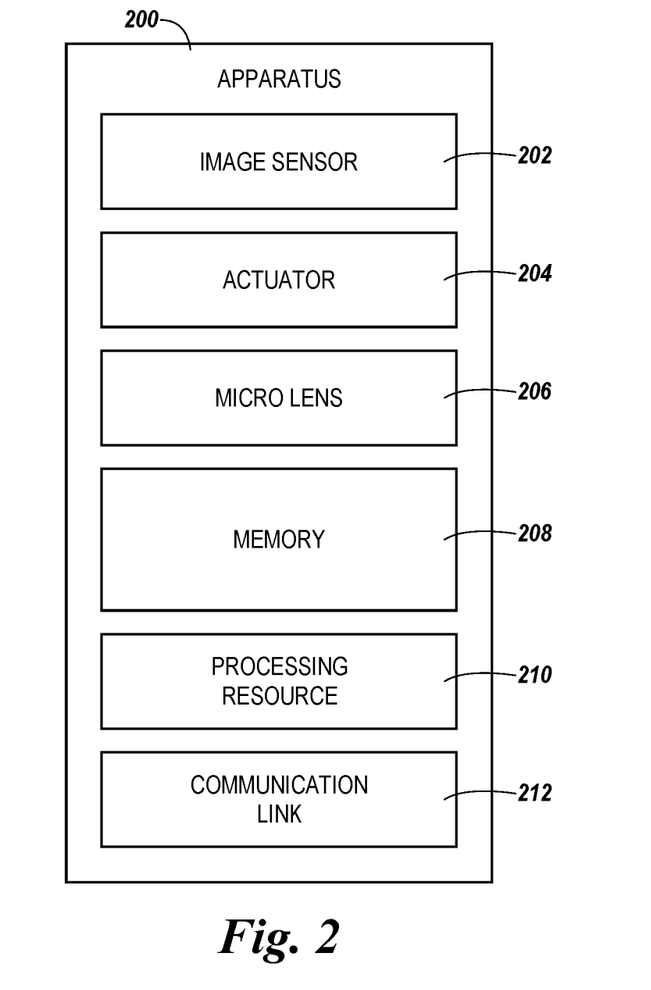
FIG. 2 illustrates an example of an apparatus for actuating an image sensor in accordance with a number of embodiments of the present disclosure.

FIG. 2 illustrates an example of an apparatus 200 for actuating an image sensor 202 in accordance with a number of embodiments of the present disclosure. Apparatus 200 can correspond to apparatus 100 in FIGS. 1A and 1B. The apparatus 200 can be, but is not limited to, a baby monitor, a security camera, a door camera, a trail camera, a tablet camera, a digital camera, a personal laptop camera, a desktop computer camera, a smart phone camera, a wrist worn device camera, an imaging device, a detection device, and/or redundant combinations thereof.

The apparatus 200 can include an image sensor 202, an actuator 204, and a micro lens 206, which can correspond to image sensor 102, actuator 104, and micro lens 106, respectively in FIGS. 1A and 1B. The apparatus 200 can further include a memory 208, a processing resource 210, and a communication link 212.

As previously described, an image sensor 202 can convert a number of photons from the light to a number of electrons to generate an image. The image sensor 202 can be, for example, a complementary metal oxide semiconductor (CMOS) sensor cell and/or a charge-coupled device (CCD) cell. A CMOS sensor cell can include a number of metal-oxide-semiconductor field-effect transistor (MOSFET) amplifiers and a CCD cell can include a number of metal-oxide-semiconductor (MOS) capacitors. The image sensor 202 can be and/or can be included in digital cameras, camera modules, camera phones, medical imaging equipment, night vision, radar, and sonar, for example.

The image sensor 202 may be coupled to an actuator 204 to allow the image sensor 202 and/or the micro lens 206 to yaw, pitch, roll, and translate to enable the image sensor 202 to follow a moving object, for example. An actuator 204 can be, for example, a micro actuator, a piezoelectric actuator, electric actuator, hydraulic actuator, pneumatic actuator, or a combination thereof.

The memory 208 can be coupled to the processing resource 210 and the memory 208 can be any type of storage medium that can be accessed by the processing resource 210 to perform various examples of the present disclosure. For example, the memory 208 can be a non-transitory computer readable medium having computer readable instructions (e.g., computer program instructions) stored thereon that are executable by the processing resource 210 to generate a first image of an area at a first time using the image sensor 202, generate a second image of the area at a second time using the image sensor 202, compare the first image to the second image, identify a moving object based at least in part on comparing the first image to the second image, and activate the actuator 204 for the image sensor 202 based at least in part on identifying the moving object.

In some examples, the processing resource 210 can identify a moving object by comparing the pixels of the first image to the pixels of the second image. If a threshold number of pixels are different the processing resource 210 can determine that one or more objects are moving.

In response to determining that one or more objects are moving the processing resource can send a command to the actuator 204 to activate to move the image sensor 202 to a particular position. The processing resource 210 can determine the particular position based on, for example, the time between generating the first image and the second image and the number of pixels between a particular pixel of the object in the first image and the particular pixel of the object in the second image The image sensor 202 can generate an image in response to a command and/or periodically. Initially, an image sensor 202 can generate an image with lower resolution and generate images less often to conserve energy, memory, and/or processing resources of the apparatus 200. In response to, for example, identifying a moving object, the image sensor 202 can generate images more often and/or generate a higher resolution image. Higher resolution images and a greater number of images can increase the accuracy of image recognition, for example. In a number of embodiments, the image sensor 202, in response to no longer identifying a moving object, can go back to generating an image with a lower resolution and/or generating images less frequently.

The images generated by the image sensor 202 can be stored in memory 208. In some examples, the images can be stored less frequently or not stored in memory until a moving object is identified to conserve energy, memory, and/or processing resources of the apparatus 200. Once an object is identified all or a greater number of images can be stored in memory 208 until a moving object is no longer identified then the images can be stored less frequently or not stored in memory 208.

In a number of embodiments, the images generated by the image sensor 202 can be stored for a particular period of time and/or in a particular type of memory (volatile or non-volatile) based on whether a moving object has been identified. For example, an image can be stored in memory 208 for a longer period of time and/or in non-volatile memory in response to the processing resource 210 identifying a moving object.

The processing resource 210 can combine one or more of the generated images to create a picture and/or video. The processing resource 210 can receive the one or more generated images from one or more image sensors 202 and/or from memory 208. In some examples, the processing resource 210 can combine an image from the image sensor 202 with an image from the memory 208.

In a number of embodiments, the memory 208 can be coupled to the image sensor 202 and can store one or more images from the image sensor 202. In some examples, the picture created by the processing resource 210 can be stored in memory 208.

The memory 208 can be volatile or nonvolatile memory. The memory 208 can also be removable (e.g., portable) memory, or non-removable (e.g., internal) memory. For example, the memory 208 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical storage, and/or a magnetic medium such as magnetic cassettes, tapes, or disks, among other types of memory.

Further, although memory 208 is illustrated as being located within apparatus 200, embodiments of the present disclosure are not so limited. For example, memory 208 can be located on an external apparatus (e.g., enabling computer readable instructions to be downloaded over the Internet or another wired or wireless connection).

As previously described, a micro lens 206 can be a lens with a diameter less than, for example, a millimeter and the micro lens 206 can be positioned such that light (e.g., a light source input) passes through the micro lens prior to being received by the image sensor 202. In a number of embodiments, the micro lens 206 can include embedded optics to reduce and/or prevent diffraction of light prior to the light being received by the image sensor 202. Diffraction is the spreading out of light waves. Light can diffract and lose its intensity with distance. The embedded optics can be coupled to or be a portion of micro lens 206. The embedded optics can be shaped to prevent light received by the image sensor 202 from being diffracted and/or decrease the amount of diffraction of the light. Light with little or no diffraction allows the image sensor 202 to generate an image from the light with a greater depth of focus, which can make the objects present in the image identifiable at a larger distance. For example, the image sensor 202 can capture an image at a greater distance away by utilizing the micro lens 206 including the embedded optics.

The embedded optics can include an axicon, a cubic phase plate, and/or a polarization conversion plate, for example. In a number of embodiments, an axicon, a cubic phase plate, and/or a polarization conversion plate can be used in conjunction with the image sensor 202. Placing an axicon, a cubic phase plate, and/or a polarization conversion plate in front of an image sensor 202 will reduce diffraction of the light received by the image sensor 202. This allows the light to maintain its intensity over a greater distance. In some examples, apparatus 200 including an axicon, a cubic phase plate, and/or a polarization conversion plate and an image sensor 202 can capture an image at a greater distance away from the apparatus 200 than an apparatus 200 including the image sensor 202 without the axicon, the cubic phase plate, and/or the polarization conversion plate.

The image sensor 202 can receive light that passed through the micro lens 206 and convert an optical image of the light into an electrical signal. For example, the image sensor 202 can convert a number of photons from the light to a number of electrons to generate an image.

The apparatus 200 can send the one or more images, the picture, and/or a video to a computing device. The computing device can be, for example, a personal laptop, a desktop computer, a smart phone, a wrist worn device, a server, or a cloud computing system. The computing device can include a user interface. In some examples, the user interface can display the one or more images, the picture, and/or video in response to identifying a moving object.

The apparatus 200 and/or the computing device can use the one or more images, the picture, and/or the video to perform image recognition on an object in response to identifying that the object is moving. In a number of embodiments, a user can be alerted via, for example, an alarm, a message, an email, and/or a phone call in response to a result of the image recognition. For example, a homeowner could be messaged in response to the image recognition operation resulting in an unknown person.

The data can be sent via communication link 212. The communication link 212 can be a network relationship through which the apparatus 200 communicates with one or more computing devices. Examples of such a network relationship can include a distributed computing environment (e.g., a cloud computing environment), a wide area network (WAN) such as the Internet, a local area network (LAN), a personal area network (PAN), a campus area network (CAN), or metropolitan area network (MAN), among other types of network relationships. For instance, the network can include a number of servers that receive information from and transmit information to apparatus 200 and/or computing devices via a wired or wireless network.

Figure 3:
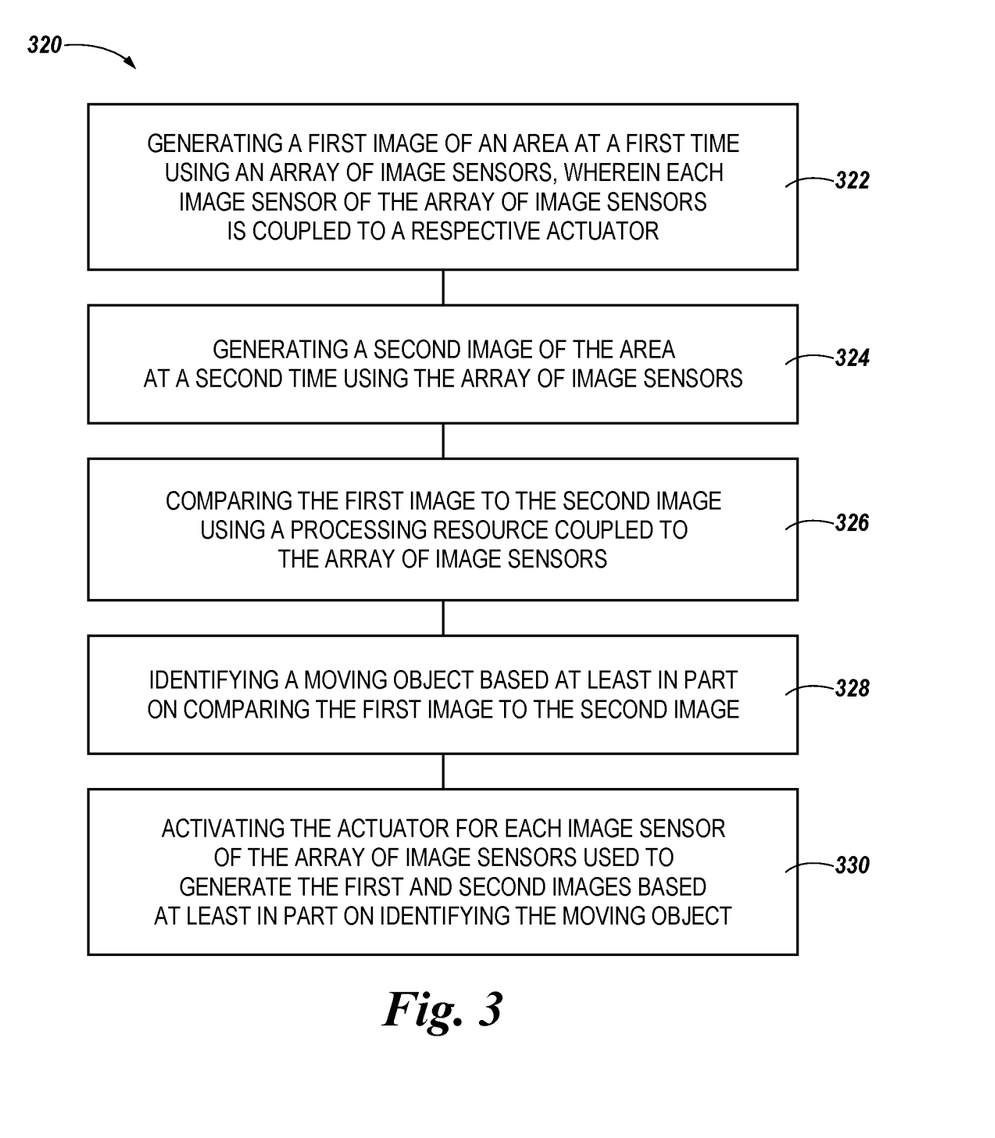
FIG. 3 is a flow diagram of a method for actuating an image sensor in accordance with a number of embodiments of the present disclosure.

FIG. 3 is a flow diagram of a method 320 for actuating an image sensor in accordance with a number of embodiments of the present disclosure. At block 322, the method 320 can include generating a first image of an area at a first time using an array of image sensors, wherein each image sensor of the array of image sensors is coupled to a respective actuator.

An image sensor can convert a number of photons from light to a number of electrons to generate an image. The image senor can generate an image in response to a command and/or periodically. The image sensor can be, for example, a complementary metal oxide semiconductor (CMOS) sensor cell and/or a charge-coupled device (CCD) cell. A CMOS sensor cell can include a number of metal-oxide-semiconductor field-effect transistor (MOSFET) amplifiers and a CCD cell can include a number of metal-oxide-semiconductor (MOS) capacitors.

At block 324, the method 320 can include generating a second image of the area at a second time using the array of image sensors. In some examples, the first and second images can be generated with lower resolution to conserve energy, memory, and/or processing resources.

At block 326, the method 320 can include comparing the first image to the second image using a processing resource coupled to the array of image sensors. For example, the processing resource can compare the pixels of the first image to the pixels of the second image.

At block 328, the method 320 can include identifying a moving object based at least in part on comparing the first image to the second image. If a threshold number of pixels are different, the processing resource can determine that one or more objects are moving.

In response to determining that one or more objects are moving the processing resource can send a command to an actuator to activate to move the image sensor to a particular position. The processing resource can determine the particular position based, for example, on the time between generating the first image and the second image and the number of pixels between a particular pixel of the object in the first image and the particular pixel of the object in the second image.

At block 330, the method 320 can include activating the actuator for each image sensor of the array of image sensors used to generate the first and second images based at least in part on identifying the moving object. An actuator can allow the image sensor to yaw, pitch, roll, and translate to enable the image sensor to move to follow a moving object. An actuator can be, for example, a micro actuator, a piezoelectric actuator, electric actuator, hydraulic actuator, pneumatic actuator, or a combination thereof.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and methods are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment.

Thus, the following claims are hereby incorporated into the Detailed Description, with each claim standing on its own as a separate embodiment.

What is claimed is:

1. A method, comprising:
generating a first image of an area at a first time using an array of image sensors and embedded optics including a polarization conversion plate, wherein each image sensor of the array of image sensors is coupled to a respective actuator;
generating a second image of the area at a second time using the array of image sensors;
comparing the first image to the second image using a processing resource coupled to the array of image sensors;
identifying a moving object based at least in part on comparing the first image to the second image;
activating the actuator for each image sensor of the array of image sensors used to generate the first and second images based at least in part on identifying the moving object, wherein activating the actuator for each image sensor enables each image sensor to at least one of: yaw, pitch, roll, or translate; and
generating images including a third image more frequently than the first image and the second image were generated using the array of image sensors based at least in part on identifying the moving object and to increase image recognition accuracy.

2. The method of claim 1, further comprising generating the third image in response to activating the actuator for each image sensor of the array of image sensors.

3. The method of claim 2, wherein the third image has a higher resolution than the first and second images in response to identifying the moving object.

4. The method of claim 1, further comprising passing light through an array of micro lenses prior to the array of image sensors receiving the light and generating the first image.

5. The method of claim 4, further comprising increasing the depth of focus of the image in response to the light passing through the array of micro lenses, wherein each micro lens of the array of micro lenses includes the embedded optics.

6. The method of claim 1, further comprising storing the first and second image in memory in response to identifying the moving object.

7. The method of claim 1, further comprising transmitting the first and second image to a user interface in response to identifying the moving object.

8. The method of claim 1, further comprising performing image recognition on the object in response to identifying the moving object.

9. The method of claim 8, further comprising alerting a user in response to a result of the image recognition.

10. An apparatus, comprising:
an array of image sensors and embedded optics including a polarization conversion plate, configured to:
generate a first image of an area at a first time; and
generate a second image of the area at a second time in response to a particular period of time passing since generating the first image;
a processing resource configured to:
compare pixels of the first image to pixels of the second image; and
identify a moving object based at least in part on comparing the pixels of the first image to the pixels of the second image;
an actuator coupled to the array of image sensors, wherein the actuator is configured to activate to enable the array of image sensors to at least one of: yaw, pitch, roll, or translate based at least in part on identifying the moving object; and
the array of image sensors configured to generate images including a third image more frequently than the first image and the second image were generated based at least in part on identifying the moving object and to increase image recognition accuracy.

11. The apparatus of claim 10, further comprising an array of micro lenses positioned to receive light prior to the array of image sensors.

12. The apparatus of claim 11, wherein the array of image sensors is configured to receive the light and generate the first image or the second image from the light.

13. The apparatus of claim 10, wherein the actuator is configured to activate to follow the moving object in response to identifying the moving object.

14. The apparatus of claim 10, wherein each image sensor of the array of image sensors is a complementary metal oxide semiconductor (CMOS) sensor cell or a charge-coupled device (CCD) cell.

15. The apparatus of claim 10, wherein each image sensor of the array of image sensors includes a number of metal-oxide-semiconductor field-effect transistor (MOSFET) amplifiers or a number of metal-oxide-semiconductor (MOS) capacitors.

16. An apparatus, comprising:
a first image sensor and embedded optics including a polarization conversion plate configured to:
generate a first image of a first portion of an area at a first time; and
generate a second image of the first portion of the area at a second time;
a second image sensor configured to:
generate a third image of a second portion of the area at the first time; and
generate a fourth image of the second portion of the area at the second time;
a processing resource configured to:
compare the first image to the second image;
identify a moving object in the first portion of the area based at least in part on comparing the first image to the second image;
compare the third image to the fourth image; and
identify a moving object in the second portion of the area based at least in part on comparing the third image to the fourth image;
an actuator coupled to the first image sensor to enable the first image sensor to at least one of: yaw, pitch, roll, or translate, wherein the actuator is configured to activate to move the first image sensor to the second portion of the area in response to detecting the moving object in the second portion of the area; and
the first image sensor configured to generate images including a fifth image of the second portion of the area at a third time more frequently than the first image, the second image, the third image, and the fourth image were generated based at least in part on identifying the moving object in the second portion of the area and to increase image recognition accuracy.

17. The apparatus of claim 16, wherein the first image sensor is configured to generate the fifth image of the second portion of the area at the third time in response to the actuator activating to move the first image sensor.

18. The apparatus of claim 16, further comprising another actuator configured to activate to move the second image sensor in response to identifying the moving object in the first portion of the area.

19. The apparatus of claim 18, wherein the second image sensor is configured to generate a sixth image of the first portion of the area at a fourth time in response to the other actuator activating to move the second image sensor.

20. The apparatus of claim 16, wherein the actuator is configured to activate to move the second image sensor with the first image sensor in response to identifying the moving object in the second portion of the area.

* * * * *